FIG. I.

United States Patent Office 2,715,608
Patented Aug. 16, 1955

2,715,608

ELECTROLYSIS OF AQUEOUS SOLUTIONS OF MIXTURES OF POTASSIUM AND SODIUM CHLORIDE

Ferri Casciani, Lewiston, and Edward J. Lang, Grand Island, N. Y., assignors to Niagara Alkali Company, New York, N. Y., a corporation of New York Application April 8, 1952, Serial No. 281,108

15 Claims. (Cl. 204—98)

The present invention relates to the electrolysis in a diaphragm-type cell of an aqueous solution of a mixture of sodium chloride and potassium chloride and to the electrolytic production of chlorine, hydrogen, caustic alkali and potassium chloride.

The production of potassium salts and particularly of potassium chloride has been an ever growing industry in this country. Certain natural deposits of salts have been discovered, particularly in southwestern United States, which possess a high percentage of potassium chloride. One type of this deposit is known as sylvinite, which is composed essentially of potassium chloride and sodium chloride in the proportions of approximately 35 to 40% potassium chloride and the remainder sodium chloride with minor amounts of impurities. Other deposits vary in proportions and in impurities.

Many processes of recovering potassium chloride from the impure ore have been devised with varying degrees of success. One general method utilizes froth flotation. Another general method utilizes separation by crystallization. Both of these methods require separate installations and are expensive to operate.

We have now found an improved process for the separation of potassium chloride from a mixture of sodium chloride and potassium chloride, such as found in sylvinite and similar ores, and for the concurrent production of caustic, chlorine, and hydrogen by means of electrolysis in a process which has not previously been disclosed.

The literature is replete with processes for preparing caustic and chlorine by the electrolysis of aqueous solutions of sodium chloride and, in fact, this has been a major industry and the primary source of commercial caustic and chlorine gas.

Electrolysis of potassium chloride in preparing caustic potash and chlorine is practiced in a like manner, but not nearly to the extent that the electrolysis of sodium chloride is practiced, due in a large part to the relatively greater availability of sodium chloride and the greater demand for caustic soda under present economic conditions.

In one type of process, an electric current is passed through an aqueous solution of the alkali metal chloride which conducts the current due to the ionization of the chloride solution, and the resulting decomposition yields chlorine, hydrogen and caustic alkali.

A diaphragm cell is one of the common types in use and in this cell a porous diaphragm separates one section of the cell containing an iron cathode from another section of the cell containing a graphite anode. The feed for the diaphragm cell is an aqueous solution of an alkali metal chloride approaching saturation and from which impurities have been largely removed. The brine is fed continuously into the cell's anode compartment where gaseous chlorine is evolved at the graphite electrodes. Simultaneously alkali hydroxide and hydrogen are formed at the iron cathode. The chlorine gas, hot and saturated with moisture, is treated to remove water. The liquid discharged from the diaphragm cell contains caustic alkali and salt and is termed cell liquor. The process is usually run to effect a decomposition of about 50% of the salt. Higher or lower decomposition rates may be practiced but the economy of the process will dictate that something in the neighborhood of 50% decomposition of the dissolved salt is the most efficient.

The cell liquor is then concentrated to about 50% caustic by evaporation. In the course of this evaporation and in the subsequent cooling nearly all of the undecomposed salt is precipitated leaving a solution which is highly concentrated caustic alkali. It is possible, for example, to precipitate all but about 1.3 to 1.4% of the undecomposed alkali chloride from the cell liquor in this way and the recovered alkali chloride can be used again. It is even possible, by special methods to separate most of the remaining small quantity of alkali chloride.

Such a process has been practiced for many years in the production of caustic soda. Similar considerations are observed in the electrolysis of potassium chloride in preparation of caustic potash, although the conditions and problems are not identical with those in the electrolysis of sodium chloride. The interest in the electrolysis of potassium chloride has been far over-shadowed by the interest and literature on the electrolysis of sodium chloride. The demand for potassium salts, caustic potash, and potassium carbonate has been augmented more recently and potassium salts are rapidly increasing in importance as chemical raw materials.

In the electrolysis of these salt solutions, the practice has been to prepare saturated brine solutions from substantially pure sodium chloride or potassium chloride salts, respectively. It was considered that by so doing there would be negligible amounts of impurities in the end products.

The electrolysis of a mixed solution of sodium and potassium chlorides has not to our knowledge been reported previously nor has there been any suggestion as to what might be the advantages or disadvantages of such a process. The reason for the lack of interest in the electrolysis of such mixed chlorides is not fully understood but it is probably based in part on the lack of economic incentive to undertake experimentation in this field. It would be natural to assume that if a mixture of sodium and potassium chlorides were electrolyzed, the resulting caustic would be a mixture of sodium and potassium hydroxides. Caustic potash is more expensive than caustic soda and its value would be degraded by including it in caustic soda. Such a mixture would not have any value for use in instances where potassium hydroxide is required, and would not ordinarily be worth more than caustic soda. Accordingly there is the incentive to separate the potassium salt from the sodium salt before electrolyzing, so that the substantially pure potassium hydroxide may be made as a premium product for uses in which it is essential.

While the above may be an explanation, other factors must be considered in evaluating the novelty and advantages of our process. In this connection consideration must be given to the factors which affect the nature of the electrolytic process. The efficiency of the electrolytic cell and the production of chlorine gas and caustic are the highest when the molar concentration of the dissolved salt in the electrolytic solution is the highest. Under these conditions, the trouble which is inevitably experienced in the oxidation and deterioration of the graphite electrodes is reduced so that any given set of electrodes will have a longer active life when the salt concentration is the highest. Also the formation of chlorine derivatives, such as chlorates, is at a minimum when the salt concentration is highest. The reduction in the amount of the various by-products formed will improve the quality of the caustic both with reference to contamination and color, and the stronger brine solution reduces the solubility of the chlorine gas in the anolyte so that more and purer chlorine gas is evolved at the anode. At a given percent decomposition in the cell, higher brine concentrations also result in increased output per cell. The evaporation cost will also be reduced because there will be less water to be evaporated in preparing the caustic product from the more concentrated cell liquor.

Furthermore, and this may be the paramount consideration, the conductivity of the electrolyte is greatest when the molar concentration of the dissolved salt is the highest. The greater the concentration, the more ions there are to conduct the current through the solution. Thus in the most efficient electrolytic cells the salt will be present in the highest concentration practicable. The above mentioned advantages of high concentration of the alkali chloride are evident regardless of how far the electrolytic decomposition is extended.

It is known that the solubility of the alkali chlorides in aqueous solutions increases with an increase in temperature of the solution, the amount depending on the chloride. Thus, it is desirable to employ a high temperature in forming the brine to take advantage of the increased solubilities and increased molar concentration of dissolved salts for the reasons above mentioned.

The practical aspects of electrolytic processes for the preparation of caustic alkali, chlorine, and hydrogen by the electrolytic decomposition of aqueous alkali chloride solutions dictate a maximum permissible temperature. Lower temperatures reduce the amount of chloride that can be dissolved in the solution and consequently lower the efficiency of the electrolytic process. On the other hand higher temperatures, while permitting the use of higher chloride concentrations, involve the added expense of maintaining equipment at such higher temperatures, and the greater likelihood that a decrease in temperature at any point will cause precipitation of the chloride in the equipment and lines. Considering all of the above factors, a brine solution that would be saturated at about 60° C. is optimum under many circumstances, but may include a range of 40° C. or lower up to 80° C. or higher.

In the above considerations, particularly the use of an optimum high temperature to permit higher brine concentrations, we have not distinguished particularly between sodium chloride and potassium chloride although the solubility of the potassium chloride varies with temperature more than does sodium chloride. This can be seen by reference to the chart comprising Figure 1 of the accompanying drawings, from which it will be seen by reference to the left-hand ordinate that the solubility of a 100% solution of sodium chloride does not vary largely between 40° and 80° C., as shown at I and J. The amount of sodium chloride that can be dissolved in water at the boiling point of 107° C. is 5.65 mols per liter which is but slightly more than the 5.48 mols per liter which can be dissolved in water at 60° C. Thus, from a practical standpoint, it is understandable why relatively high temperatures are not used in making sodium chloride brines.

Figure 1:
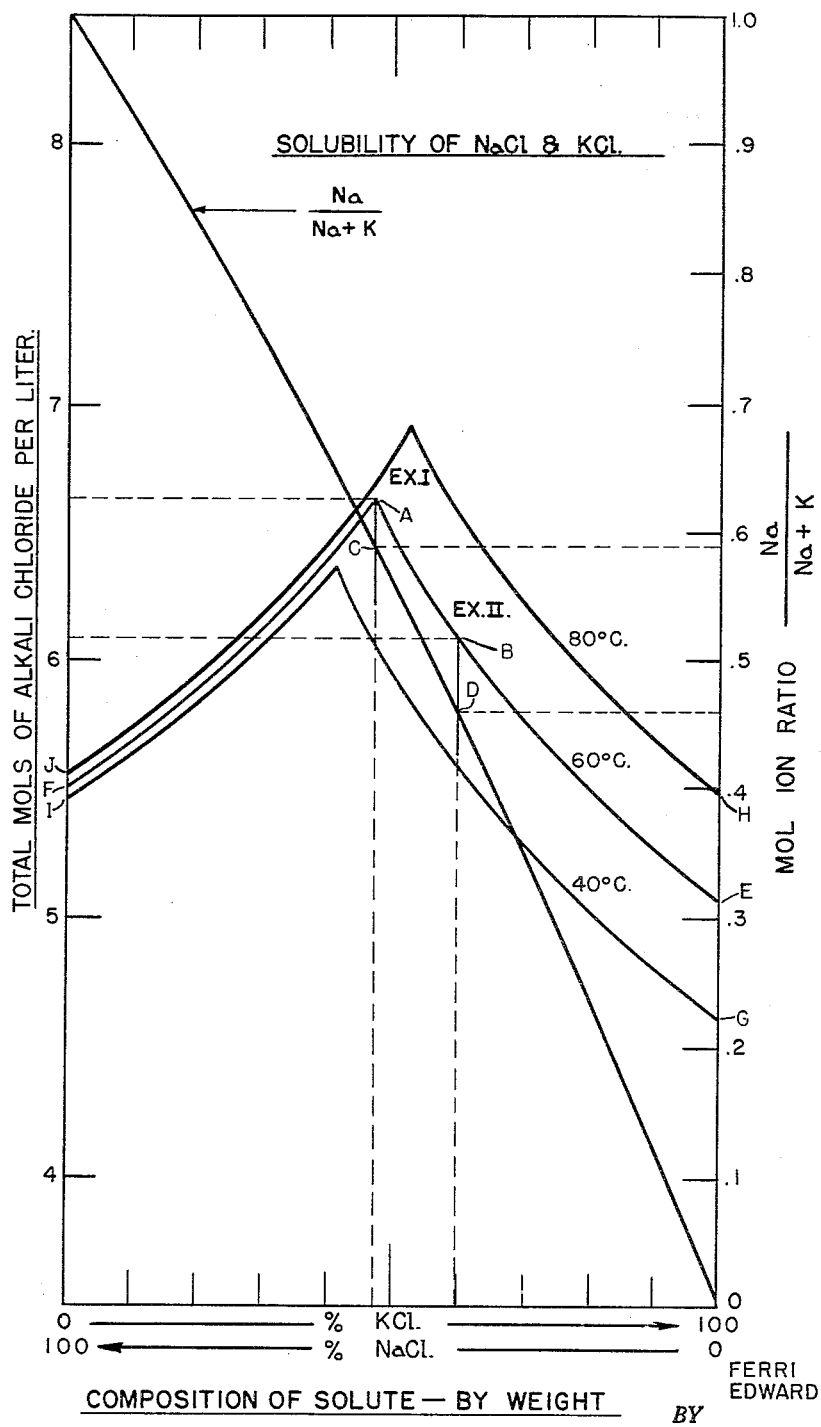
Figure 1 is a chart showing solubility of sodium chloride and potassium chloride.

Potassium chloride, on the other hand, as seen from the ordinate on the right side of Figure 1, is less soluble at lower temperatures but the solubility increases more rapidly with an increase in temperature. For instance, as shown at E and F in Fig. 1, potassium chloride is less soluble at 60° C. than sodium chloride on a molar basis. The solubility, however, increases more rapidly with temperature. As is seen from a comparison of points G and H and points I and J of Figure 1, the difference in solubility between 40° C. and 80° C. is much greater in the case of a 100% solution of potassium chloride than it is in the case of sodium chloride.

In addition to these distinctions, the solubility characteristic which is of greater significance to our invention is that certain mixtures of potassium chloride and sodium chloride are much more soluble than either salt alone. This permits greater concentrations of total of mixed alkali chlorides than is possible with either salt. Referring to Figure 1 it is noted that as potassium chloride is added to sodium chloride, the total mols of alkali chloride per liter rises rapidly until a peak is reached. Similarly when sodium chloride is added to potassium chloride the solubility is increased towards the same peak. Figure 1 gives in graph form the solubility data at temperatures of 40°, 60° and 80° C. A similar family of curves can be drawn at other temperatures, but these three temperatures cover the practical ranges of brine concentrations and temperatures for the most part and therefore, are illustrative. It is to be understood that a similar phenomenon is obtained at all temperatures and that the invention is not limited to the temperatures shown as illustrative. The peaks in the curves above referred to, representing solutions saturated at different temperatures, fall within the general range of 40 to 60% potassium chloride by weight, depending on the temperature.

In a solution saturated at 60° C. in which the salts are distributed as 53% sodium chloride and 47% potassium chloride by weight, the composition of the solution is 18.4% sodium chloride, 16.4% potassium chloride and 65.2% water and the molar concentration of total salts in the saturated solution at 60° C. is 6.62 mols per liter, which is the maximum for a solution saturated at this temperature. At higher temperatures the relative proportion of potassium chloride by weight will be slightly greater at the point at maximum salt concentration and at lower temperatures the proportion of potassium chloride by weight at maximum salt concentration will be somewhat lower. The maximum concentration of total chlorides soluble in a saturated aqueous solution at 60° C. is shown at the peak A of the curve in Figure 1. This composition is used in an illustrative Example I hereinafter.

When the proportion of potassium chloride is higher, the total molar concentration of dissolved salts begins to decrease. For example, in a saturated solution in which salts are distributed as 39.6% sodium chloride and 60.4% potassium chloride, the composition of the solution is 13.1% sodium chloride and 20.0% potassium chloride and 66.9% water and the total molar concentration is 6.04 mols per liter. This point is indicated at B on Figure 1 and this solution is described hereinafter as Example II. Specific examples of solutions at other temperatures, can be employed in accordance with the invention. For the purpose of illustration only, the practical and presently desirable temperature of 60° C. is utilized in the specific illustrative embodiments.

The mixture of potassium and sodium chlorides used in accordance with the invention has the distinct and marked advantage of permitting higher total salt concentrations in the cell feed brine at any temperature level than could be obtained using either potassium or sodium chloride alone. Furthermore, because potassium chloride has a higher conductivity than sodium chloride, the introduction of the additional salt as potassium chloride and the substitution of potassium chloride for a portion of the sodium chloride, results in a further increase in the conductivity of the solution with a resultant decrease in power requirements. The invention, therefore, possesses, to a degree hitherto unknown, all of the advantages enumerated heretofore of operating with more concentrated solutions, more particularly the enhanced conductivity of the solution, the minimizing of impurities in the products, the retardation of electrode deterioration, and the other advantages mentioned which are recognized in the art as desirable attributes of an electrolytic process.

While the above advantages of the invention are very significant, particularly from an economic point of view, there are other advantages quite unexpected which make the process unusually attractive. We have discovered in accordance with our invention that if a cell liquor of this general composition is evaporated to reduce the water, the K+ and the Cl− ions combine and precipitate as potassium chloride and the Na+ and OH− ions remain in solution for the formation of caustic soda. In fact, by judicious selection of the proportion of sodium chloride and potassium chloride in the starting material, as will be brought out later in a consideration of the specific examples, it is possible to separate all but a small amount of the potassium as potassium chloride and to prepare a caustic that is all caustic soda, except for a small amount of caustic potash. This is unknown as far as can be ascertained and was completely surprising to us. It offered the basis for a highly interesting and practical process of preparing pure potassium chloride requiring no more than the ordinary steps that would be required in preparing caustic soda, chlorine and hydrogen.

The invention can be considered as a process for preparing pure potassium chloride as a by-product of a chlorine-alkali process, or in the alternative a process of preparing pure potassium chloride in which caustic, chlorine, and hydrogen are by-products. The potassium chloride can be separated as an entirely pure product, uncontaminated by sodium chloride. The caustic soda contains a small amount of caustic potash but this is not an impurity which lowers its value as caustic soda for commercial uses.

The potassium chloride which is separated may be used as such for any of the purposes for which it is now employed. For example, it may be electrolyzed to prepare pure caustic potash or it may be used to fortify additional sodium-potassium chloride ores for electrolysis. It may be used in making chlorates, perchlorates, in the fertilizer industry etc.

The relative proportions of sodium and potassium chlorides that can be used in practicing the invention will be better understood after a consideration of the illustrative examples.

Summarizing the above discussion, we have found that in our novel process, using a solution of a mixture of sodium chloride and potassium chloride salts, there are a number of advantages, including, among others (1) the use of a relatively inexpensive mixture of sodium and potassium chlorides as raw materials, (2) the production of pure crystalline potassium chloride as a valuable by-product, and (3) the use of higher brine concentrations in the cell with resulting operation economies and benefits. These and other advantages will be discussed more fully hereinafter in connection with the illustrative examples.

Figure 2:
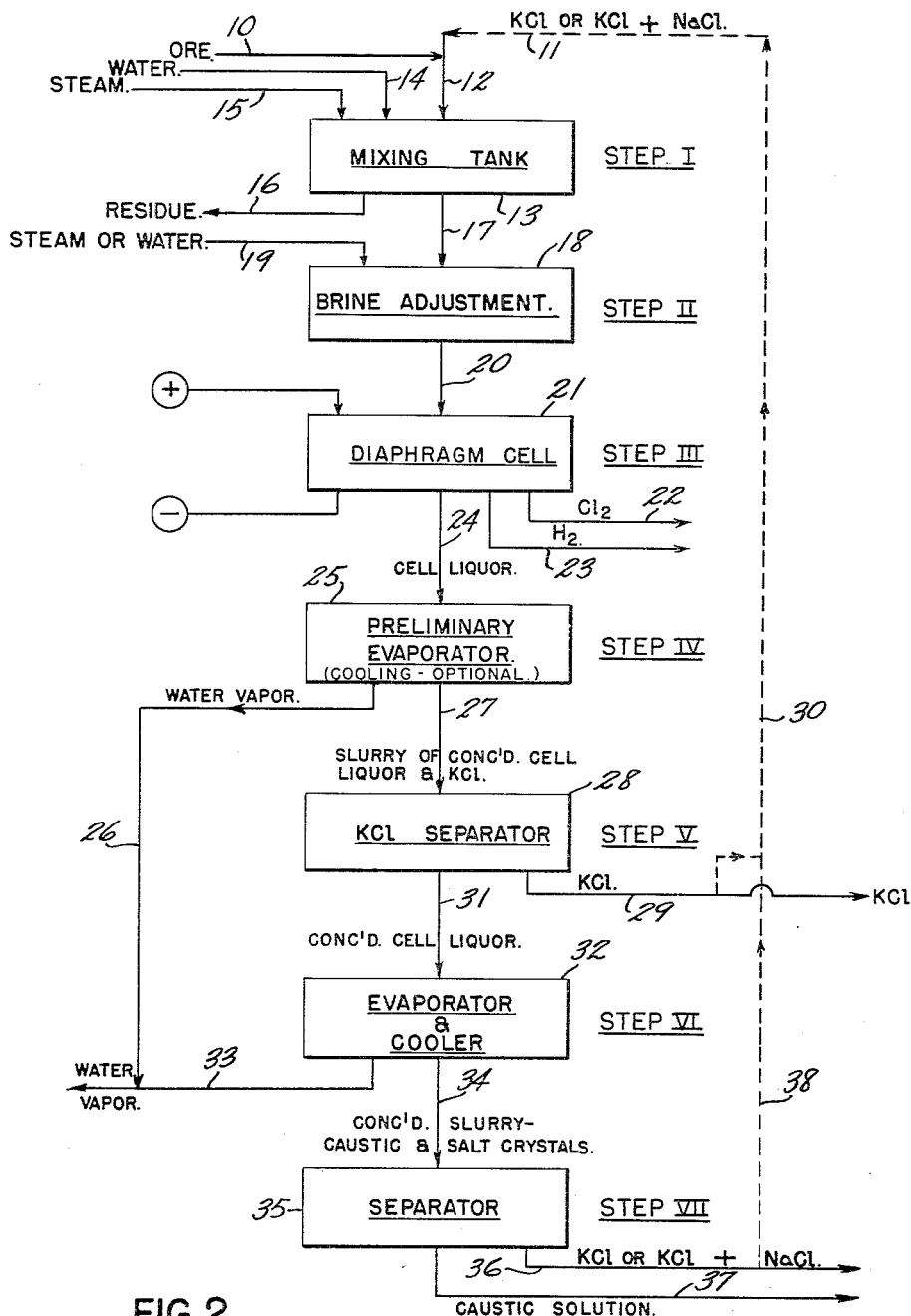
Figure 2 is a flow sheet illustrative of the invention.

A satisfactory flow sheet for an over-all electrolytic process for the recovery of pure potassium chloride from an aqueous solution of sodium chloride and potassium chloride is shown in Figure 2. In Step I, sodium chloride and potassium chloride are introduced at 10 (or 10 and 11) through 12 into a mixing tank 13 where they are dissolved in water which may be introduced into the tank at 14. The mixture may be heated to any desired temperature by the introduction of steam through a line 15. Any undissolved salts or residue may be removed as indicated at 16. The solution of sodium and potassium chlorides is passed at 17 into a brine adjuster 18 where the feed brine is adjusted in Step II to the desired feed temperature and concentration by heating or cooling or adding water through a line 19. The adjusted feed brine is transferred at 20 to Step III wherein it is electrolyzed in a diaphragm-type electrolytic cell 21. Chlorine gas is evolved from the brine solution at the anode and removed at 22 for drying and purification. Hydrogen gas is evolved from the electrolytic cell at the cathode and removed at 23.

The resulting cell liquor containing Na+, K+, Cl− and OH− ions is removed from the diaphragm cell at 24 and passed into evaporator 25 where it is subjected to preliminary evaporation in Step IV. Water vapor from the evaporation is removed as indicated at 26 and a slurry of concentrated cell liquor and potassium chloride crystals is passed at 27 into a potassium chloride separator 28 in Step V where pure potassium chloride is separated from the slurry by filtration, centrifuging, settling or similar means. If desired, additional potassium chloride may be crystallized from the liquor obtained from the evaporator by cooling it before final separation of crystals from it.

Reference in the process to the evaporation of cell liquor includes boiling at atmospheric pressure or at reduced pressures corresponding to boiling points as low as room temperature, which may or may not be followed by cooling of the slurry to temperatures as low as room temperature or somewhat lower, for example, 10° C., with separation of crystals from mother liquor taking place either after cooling or both before and after cooling. While we shall speak specifically of the removal of water by means of evaporation, we do not mean to exclude other possible methods of concentrating the cell liquor, such as, for example, by the application of ion exchange substances or by decomposition of water by electrolysis.

The separated crystalline potassium chloride is removed at 29. It may be used as such or a portion of the potassium chloride may be recycled through 30 to the feed line 11 to adjust the concentration of potassium chloride in the feed brine if desired. The remaining concentrated cell liquor, after the removal of the pure potassium chloride, is transferred at 31 into an evaporator and cooler 32 where the cell liquor is further concentrated in Step VI. Water vapor from the evaporation is removed at 33 and the concentrated slurry of caustic and salt crystals is passed at 34 into a separator 35 from which salt crystals are removed at 36 from the caustic solution which is removed at 37.

In certain modifications of the process, the salt crystals removed at 36 will also be pure potassium chloride and this may be used as such and added to the potassium chloride recovered at 29 or recycled through 30 as a part of the recycled salt. In other modifications of the process, the salt crystals obtained at 36 may be potassium chloride contaminated with different amounts of sodium chloride and the product may be removed entirely from the system and used as such; or, if desired, it may be recycled via 38 and 30 to the feed line 11.

The flow sheet of the process has been illustrated with two chloride separation steps but it will be understood that there may be only one separation step or more than two, if desired. The details of equipment, valves and lines are omitted from the flow diagram for the sake of clarity and they will be familiar to those skilled in the art.

In the following examples of the process, the naturally occurring sylvinite ore is employed as illustrative of the best mode of practicing the invention. New Mexico sylvinite varies greatly in composition; however, material from at least one source contains approximately 60% sodium chloride, 40% potassium chloride and minor amounts of various impurities. Concentrates prepared from such ore and containing a higher percentage of potassium chloride are available and may also be used in preparing brine for our process. Brine obtained from partially dried-up lake beds or prepared by dissolving natural salt mixtures is useful as raw material for our process. Any raw material which provides mixtures of sodium chloride and potassium chloride may be used. Should it prove economically feasible to do so, potassium chloride relatively free from sodium chloride may be added to regular sodium chloride brine in order to realize the operating advantages of our process.

The mineral, carnallite ($MgCl_2 \cdot KCl \cdot 6H_2O$) may be utilized as the raw material for our process by converting the magnesium chloride to sodium chloride by treatment with caustic soda. When the caustic for this treatment is obtained from the electrolysis of the resultant sodium and potassium chloride mixture, the ultimate products would be magnesium hydroxide, potassium chloride, chlorine, and hydrogen. In like manner, brines containing calcium chloride and potassium chloride can be worked up to produce calcium hydroxide as the alkaline product. In this way, our process may form the basis for industrial methods of producing chlorine without at the same time ending up with caustic soda as co-product. Other raw materials comprising a mixture of magnesium chloride and potassium chloride may be used, such as the natural brines of Salduro Marsh, Utah.

It is understood that brine prepared from sylvinite or from other natural sources will contain small amounts of impurities. In many instances, it may be desirable to treat such a brine so as to remove a portion or substantially all of these impurities before introducing it into the electrolytic cell. This purpose may be accomplished in any known manner, for example, by settling out or filtering off insoluble impurities such as clay, sand, etc.; or by treating the brine chemically to precipitate impurities such as soluble calcium and magnesium salts and sulfates, for example, by the addition of precipitating agents such as sodium carbonate, sodium hydroxide, calcium chloride, barium chloride, etc., followed by settling or filtering to remove the insoluble compound formed. Soluble impurities which may tend to build up in the system if any substantial amount of recovered salt, either potassium chloride or mixed salt, is returned to process, such as for example, sulfate, may if desired, be removed from brine prepared from the recovered salt rather than from the new brine.

In describing the composition of the various solutions in the following examples, the term "mol ion" is employed and this refers to a quantity of the substance in question, equal to its atomic weight or to the sum of the atomic weights of the elements which comprise it. For example, a mol ion of sodium is 23 parts by weight; a mol ion of potassium is 39.1 parts by weight; a mol ion of hydroxide is 17 parts by weight; and a mol ion of chlorine is 35.5 parts by weight.

EXAMPLE I

In Step I, a saturated brine is prepared by dissolving sylvinite ore in water at 60° C. at atmospheric pressure. Nearly all the KCl in the ore dissolves leaving behind the excess NaCl together with a very small amount of KCl and all the insoluble impurities. The brine contains 18.4 parts of NaCl and 16.4 parts of KCl per 100 parts of solution. This brine contains the maximum possible molar concentration of a mixture of the NaCl and KCl saturated at this temperature. The molar concentration is given in column $a$ of Table I–A hereinafter. The concentration of total solids in the brine is 6.62 mols per liter, or 20.8% higher than that of a NaCl brine saturated at the same temperature. This brine is indicated at A in Figure 1.

In Step II, the brine, saturated at 60° C., is heated for cell feed purposes without dilution or further concentration.

The preheated brine from Step II is then fed (Step III) in the customary manner to a diaphragm-type cell and the electrolysis is carried out to achieve 48% decomposition. This is within the range of about 50% decomposition mentioned heretofore as the usual practice. Chlorine and hydrogen gases are given off in the usual manner and the resulting caustic cell liquor contains water, $Na^+$, $K^+$, $OH^-$, and $Cl^-$ ions. The composition of the cell liquor is indicated in column $b$ of Table I–A.

It will be understood that for a given composition of brine feed and a given percent decomposition in the cell, the composition of the cell liquor can be calculated, as well as determined by analysis. The cell liquor in this example, for instance, could be made by dissolving 3.9 parts of NaCl, 19.1 parts of KCl and 12.0 parts of NaOH in 65.0 parts of water.

The cell liquor is then processed in any suitable type of evaporating equipment according to Steps IV, V, VI, and VII. The evaporation can be carried to any degree but is generally carried to produce a caustic concentration of about 50%. At this concentration the salt content is small, and caustic of this concentration can be used in many industries. Further concentration or purification can be achieved by known processes which are not a part of the invention. The evaporation may be carried out, preferably as in this example, in several stages. After each stage of evaporation, the salt crystals are separated by filtration or any other suitable technique. In this example, the stages will be adjusted so that the chloride that is separated in the first or early stage will be KCl uncontaminated by NaCl, and in the last or subsequent stages a mixture of KCl and NaCl will be separated, as will be explained later.

After each stage of evaporation and especially after the final step of evaporation, it is desirable to cool the slurry to approximately room temperature or somewhat lower before separation of the salt to reduce the chloride content of the final caustic solution to a minimum and to increase the recovery of the chloride. This cooling is especially desirable because in the later evaporation stages, a point may be reached at which a small amount of NaCl may crystallize out at elevated temperatures and go back into solution if the slurry is cooled before separating the crystals from it.

In this particular example, a total of four successive evaporations were carried out and the composition of the evaporated liquors is shown in columns $c$, $d$, $e$, and $f$ of Table I–A hereinafter. The changes in the composition of the solution after each evaporation are shown in Table I–B in which the mols of water and mol ions are expressed per mol ion of OH.

The composition of the caustic solution after the final evaporation may be determined from the data in Table I–A, Table I–B and is set forth in Table I–C.

EXAMPLE II

In Step I, sylvinite ore is dissolved in water at a temperature of about 125° C., under a pressure of 35 pounds per square inch gauge. Excess NaCl together with a very small amount of KCl and impurities is left behind and is removed. Brine prepared under these conditions will contain the enhanced proportion of KCl to NaCl represented by point B in Fig. 1.

In Step II, the saturated brine is diluted to the concentration which represents saturation at 60° C. and then is cooled to the temperature desired for feeding to the cell. The brine feed contains 13.1 parts of NaCl and 20.0 parts of KCl per 100 parts of solution. The molar concentration is given in column $a$ of Table II–A hereinafter. The concentration of total solids in the brine is 6.04 mols per liter, or 10.2% higher than that of a NaCl brine saturated at the same temperature. This brine is indicated at B in Fig. 1.

It will be understood that the sylvinite ore may be dissolved at temperatures lower than 125° C. in which case the ratio of KCl to NaCl in the brine will be lower and it will be necessary to add KCl to the brine after dilution or as a concentrated KCl brine to bring the level up to the level desired in this example.

The diluted brine from Step II is then fed (Step III) in the customary manner to a diaphragm-type cell and the electrolyzing is carried out to achieve 48% decomposition as in the previous example. Chlorine and hydrogen gases are given off in the usual manner and a caustic cell liquor remains containing $Na^+$, $K^+$, $OH^-$, and $Cl^-$ ions.

The composition of cell liquor is shown in column $b$ of Table II–A.

As explained in connection with the previous example the composition of the cell liquor can be calculated as well as determined experimentally. The cell liquor in this example for instance can be made by dissolving 15.2 parts of NaCl, 2.6 parts of KCl, 15.5 parts of KOH in 66.7 parts of water.

The cell liquor can then be processed in any suitable type of evaporating equipment according to Steps IV, V, VI and VII, as explained in the previous example. In this example, a total of three successive evaporations were carried out and the composition of each evaporated solution is shown in columns c, d, and e in Table II–A. In this case only KCl is separated and it is unnecessary to conduct the evaporation so as to distinguish between the separation of KCl and a mixture of it with NaCl. For this reason all of the evaporation may be carried out in a single stage.

The changes in the composition of the solution after each evaporation are shown in Table II–B in which the mols of water and mol ions are expressed per mol ion of OH.

The composition of the caustic solution after the final evaporation may be determined from the data in Table II–A and Table II–B and is set forth in Table II–C.

The final caustic solution arrived at in Examples I and II, which is equivalent in concentration to about 50% NaOH, may, if desired, be further concentrated, for example, to 73% concentration, or even to a substantially anhydrous product, before it is marketed.

The tables referred to hereinbefore follow in which the figures represent actual analysis within the margin of experimental error.

(Example I)

Table I–A
COMPOSITION OF SOLUTION
[In mols of water and mol ions per 100 g. of solution]

|  | Cell Feed Brine | Cell Liquor | Concentrated Solution ||||
|---|---|---|---|---|---|---|
|  |  |  | After 1st Evap. | After 2d Evap. | After 3d Evap. | After 4th Evap. |
|  | (a) | (b) | (c) | (d) | (e) | (f) |
| Na | 0.315 | 0.366 | 0.515 | 0.598 | 0.658 | 1.155 |
| K | 0.220 | 0.256 | 0.131 | 0.092 | 0.094 | .071 |
| OH | 0.000 | 0.299 | 0.421 | 0.494 | 0.603 | 1.209 |
| Cl | 0.535 | 0.323 | 0.225 | 0.196 | 0.149 | .017 |
| H₂O | 3.62 | 3.61 | 3.77 | 3.74 | 3.64 | 2.75 |
| Percent H₂O* | 65.16 | 64.98 | 67.86 | 67.32 | 65.52 | 49.50 |

*Computed by multiplying the mols of $H_2O$ in the preceding line×18.

Table I–B
CHANGE IN COMPOSITION OF SOLUTION ON EVAPORATION
[In mols of water and mol ions per mol ion of OH]

|  | Original Cell Liquor,[1] Composition | After 1st Evaporation || After 2d Evaporation || After 3d Evaporation || After 4th Evaporation || Over-all, Loss[2] |
|---|---|---|---|---|---|---|---|---|---|
|  |  | Comp. | Loss[2] | Comp. | Loss[2] | Comp. | Loss[2] | Comp. | Loss[2] |  |
|  | (a) | (b) | (c) | (d) | (e) | (f) | (g) | (h) | (j) | (k) |
| Na | 1.22 | 1.22 | 0.00 | 1.21 | 0.01 | 1.09 | 0.12 | 0.95 | 0.14 | 0.27 |
| K | 0.85 | 0.31 | 0.54 | 0.18 | 0.13 | 0.15 | 0.03 | 0.05 | 0.10 | 0.80 |
| OH | 1.00 | 1.00 | 0.00 | 1.00 | 0.00 | 1.00 | 0.00 | 1.00 | 0.00 | 0.00 |
| Cl | 1.08 | 0.54 | 0.54 | 0.40 | 0.14 | 0.25 | 0.15 | 0.01 | 0.24 | 1.07 |
| H₂O | 12.06 | 8.96 | 3.10 | 7.57 | 1.39 | 6.04 | 1.53 | 2.27 | 3.77 | 9.79 |

[1] The values in this column are the same as in column b of Table I-A, but expressed in units based on an OH value of 1.00.
[2] Loss due to removal of steam and chlorides.

Table I–C
CAUSTIC COMPOSITION

|  | Percent |
|---|---|
| Sodium hydroxide | 46.2 |
| Potassium hydroxide | 3.1 |
| Potassium chloride | 1.2 |
| Water | 49.5 |

(Example II)

Table II–A
COMPOSITION OF SOLUTION
[In mols of water and mol ions per 100 g. of solution]

|  | Cell Feed Brine | Cell Liquor | Concentrated Solution |||
|---|---|---|---|---|---|
|  |  |  | After 1st Evap. | After 2d Evap. | After 3d Evap. |
|  | (a) | (b) | (c) | (d) | (e) |
| Na | 0.225 | 0.260 | 0.369 | 0.676 | 1.225 |
| K | 0.269 | 0.311 | 0.208 | 0.125 | 0.092 |
| OH | 0.000 | 0.276 | 0.390 | 0.715 | 1.299 |
| Cl | 0.494 | 0.295 | 0.187 | 0.086 | 0.018 |
| H₂O | 3.71 | 3.70 | 3.89 | 3.57 | 2.53 |
| Percent H₂O* | 66.78 | 66.60 | 71.22 | 64.26 | 45.54 |

*Computed by multiplying the mols of $H_2O$ in the preceding line×18.

Table II–B
CHANGE IN COMPOSITION OF SOLUTION ON EVAPORATION
[In mols of water and mol ions per mol ion of OH]

|  | Original Cell Liquor,[1] Composition | After 1st Evaporation || After 2d Evaporation || After 3d Evaporation || Over-all, Loss[2] |
|---|---|---|---|---|---|---|---|---|
|  |  | Comp. | Loss[2] | Comp. | Loss[2] | Comp. | Loss[2] |  |
|  | (a) | (b) | (c) | (d) | (e) | (f) | (g) | (h) |
| Na | 0.94 | 0.94 | 0.00 | 0.94 | 0.00 | .94 | 0.00 | 0.00 |
| K | 1.12 | 0.53 | 0.59 | 0.17 | 0.36 | .07 | 0.10 | 1.05 |
| OH | 1.00 | 1.00 | 0.00 | 1.00 | 0.00 | 1.00 | 0.00 | 0.00 |
| Cl | 1.07 | 0.48 | 0.59 | 0.12 | 0.36 | .01 | 0.11 | 1.06 |
| H₂O | 13.41 | 9.97 | 3.44 | 4.99 | 4.98 | 1.95 | 3.04 | 11.46 |

[1] The values in this column are the same as in column b of Table II-A, but expressed in units based on an OH value of 1.00.
[2] Loss due to removal of steam and chlorides.

Table II-C

CAUSTIC COMPOSITION

|  | Percent |
|---|---|
| Sodium hydroxide | 49.0 |
| Potassium hydroxide | 4.2 |
| Potassium chloride | 1.3 |
| Water | 45.5 |

The composition of the cell brine feeds as determined by analysis is included in Tables I–A and II–A expressed in terms of molar quantities. The conversion to parts by weight is given heretofore in the examples. The effect of the difference in composition between the two examples can be seen from a consideration of the data in the tables, especially Tables I–B and II–B.

From Table II–B it will be noted from the columns c, e, g and h that potassium chloride is the only solid constituent separated from the solution after each evaporation step. In this example, it is possible to recover 93.7 mol percent $$\left(\frac{1.05}{1.12} \times 100\right)$$

of the potassium chloride content of the original brine and as pure solid potassium chloride. The mol ion ratio $$\frac{Na}{OH}$$

in the final caustic solution is the same as that of the original cell liquor, namely, 0.94 (columns a and f).

Table I–B, columns b to e, shows that potassium chloride was the only solid obtained in the first evaporation step. Only a small amount of sodium chloride is separated in the second evaporation step. Had the evaporation in the second step been carried not quite so far, all of the solid obtained in the second step would have been potassium chloride and a total of about 75% of the potassium chloride in the original brine could have been separated. The solid separated in the third and fourth steps is a mixture of potassium and sodium chloride.

It is important to note in connection with Tables I–C and II–C that the composition of the final caustic solution is very similar in both examples in spite of the difference in the composition of the initial brines and the initial cell liquors. The primary component is sodium hydroxide with a small amount of potassium, a part of which is expressed as chloride and the balance as hydroxide. A significant point to note is that the mol ion ratio $$\frac{Na}{OH}$$

in the final caustic solution in Table I–B is substantially the same as in Table II–B, namely, 0.95 (column h, Table I–B).

A marked advantage of the process that is also to be observed in connection with Examples I and II is that less water must be evaporated to obtain a caustic of the same concentration. In Example I, for instance, the amount of water removed in the entire evaporation procedure to obtain a caustic of the same concentration was about 30% less than that which would have to be removed from a pure sodium chloride brine prepared by electrolyzing at the same percentage decomposition a sodium chloride brine saturated at the same temperature. This advantage results from the increased solubility of the mixed chlorides in the brine. In other words, since it takes less water to dissolve a given amount of the mixed chlorides, there is less water to evaporate at the end of the process.

In Example II, the amount of water removed in the entire evaporation procedure was about 20% less than that which would have to be removed from a pure sodium chloride cell liquor prepared by electrolyzing at the same percentage decomposition a sodium chloride brine saturated at the same temperature.

From the above data certain conclusions may be drawn:

I. The proportions of potassium and sodium chloride may be adjusted in the starting brine, considering the extent of conversion, so that the proportions of Na⁺, K⁺, Cl⁻, and OH⁻ ions are such that all of the chloride which will be separated upon concentration of the cell liquor will be separated as potassium chloride uncontaminated by sodium chloride. A small additional amount of potassium will remain in the caustic and cannot be separated as potassium chloride. Such an ideal brine is indicated at point B in Fig. 1 assuming 48% decomposition in the cell. Example II shows that when the $$\frac{Na}{OH}$$

mol ion ratio is approximately 0.95, potassium chloride alone will be obtained on evaporation and the potassium content of the final caustic solution will be at a minimum.

II. When the relative proportion of sodium chloride is increased to the left of point B (such as at point A) the chloride precipitated upon concentration of the cell liquor will at first be potassium chloride. As the cell liquor becomes more concentrated the precipitate will be a mixture of potassium and sodium chlorides. Starting with a brine of the composition represented by point A of Fig. 1, it is possible to carry on the concentration so as to separate about 75% of the potassium chloride as a pure product, and to use it for any purpose, and then to precipitate and recover about an additional 18% of the potassium chloride mixed with sodium chloride for recycle to the process. In such a solution as point A in Fig. 1 the amount of Na⁺ ions is more than will combine with the OH⁻ ions in the cell liquor and the excess Na⁺ ions will be separated as NaCl. The composition of point B offers the advantage of being able to separate all of the recoverable chloride as uncontaminated potassium chloride. The composition of point A has the advantage of having a higher maximum total alkali chloride concentration with the consequent superior electrolytic efficiency, but at the sacrifice of producing some of the potassium chloride contaminated with the sodium chloride.

In other words, when the mol ion ratio $$\frac{Na}{OH}$$

in the cell liquor exceeds approximately 0.95 some potassium chloride will always be recovered in admixture with sodium chloride, and the potassium content of the final caustic solution will remain at a minimum the same as in Example II. In such cases, the amount of sodium in the brine feed represented at points to the left of the point B in Fig. 1 is sufficiently high so that a part will be separated as sodium chloride along with some of the potassium chloride.

As the ratio of sodium chloride to potassium chloride is increased in the brine feed, a point will be reached at which no potassium chloride can be separated in the pure form upon evaporation. A point is reached where the amount of sodium is so large in proportion to the potassium that all of the precipitated chlorides will be a mixture of sodium and potassium. There is little economic advantage in operating the process under such circumstances because one of the attractive features of the process is to be able to separate at least some potassium chloride in the pure form uncontaminated by sodium chloride.

The maximum proportion of sodium chloride that may be in the starting brine and still make it possible to obtain at least some pure potassium chloride during the evaporation of the cell liquor may best be represented by the mol ion ratio $$\frac{Na}{Na+K}$$

This ratio is particularly useful in determining this limit because it is the same for the brine feed as in the cell liquor before evaporation. As illustrative, the $$\frac{Na}{Na+K}$$

mol ion ratio in the brine feed and original cell liquor in Example I is 0.59 and in Example II is 0.46.

The maximum $$\frac{Na}{Na+K}$$

mol ion ratio in the brine which will permit at least some pure potassium chloride to be separated upon evaporation of the original cell liquor before a mixture of potassium chloride and sodium chloride is precipitated, is about 0.85 and 0.90 for a decomposition in the cell of 40% and 60% respectively. Considering 60% conversion as the maximum that is practical, the maximum $$\frac{Na}{Na+K}$$

mol ion ratio of the brine feed would be 0.90 which corresponds to an $$\frac{Na}{OH}$$

mol ion ratio of 1.5 in the original cell liquor and a maximum of 87.5% sodium chloride and a minimum of 12.5% potassium chloride in the brine feed on a weight basis. At 40% conversion, while the mol ion ratio $$\frac{Na}{Na+K}$$

is about 0.85, the corresponding $$\frac{Na}{OH}$$

ratio is 2.1.

III. If the proportions of potassium chloride are increased, such as to a point to the right of point B of Fig. 1, all the recoverable chloride can be separated as potassium chloride and the excess potassium will be in the form of a higher relative proportion of caustic potash in the caustic product. In other words, whenever the mol ion ratio $$\frac{Na}{OH}$$

in the cell liquor is less than 0.95, potassium chloride alone will be obtained upon evaporation but the potassium content in the final caustic solution will be proportionally higher, which is tantamount to an increase in the potassium hydroxide content. Special applications may require a mixed caustic alkali. Economic considerations show that it is undesirable to increase the potassium hydroxide content of the caustic to the point where it exceeds the sodium hydroxide content on a weight basis.

The maximum proportion of potassium chloride that may be in the starting brine and still produce a final caustic that is predominantly sodium hydroxide may best be represented by the $$\frac{Na}{OH}$$

ratio. This ratio is particularly useful in determining this limit because the mol ion ratio of Na+ to OH− in the final caustic solution will be the same as that in the original cell liquor. This necessarily follows because no sodium is removed as chloride during the evaporation.

The minimum $$\frac{Na}{OH}$$

mol ion ratio in the cell liquor and caustic solution which will assure a caustic product predominantly sodium hydroxide is 0.6. This corresponds to a caustic of approximately 51% sodium hydroxide and 49% potassium hydroxide.

To convert the $$\frac{Na}{OH}$$

ratio to $$\frac{Na}{Na+K}$$

ratio it is necessary to take into account the percent of conversion. The $$\frac{Na}{Na+K}$$

mol ion ratios corresponding to a $$\frac{Na}{OH}$$

mol ion ratio of 0.6 at 40% and 60% conversion are respectively 0.24 and 0.36. Assuming that it is not practical to operate at a conversion less than 40%, the minimum $$\frac{Na}{Na+K}$$

ratio would be 0.24 which would correspond to a brine of about 80% potassium chloride and about 20% sodium chloride by weight.

The above range of starting brines, namely, those containing a potassium chloride content of about 12.5% to 80% and a sodium chloride content of about 20% to 87.5% are all well outside the scope of mixtures which may possibly have heretofore been used in the form of one of the chlorides containing the other as an impurity.

It will be apparent that the relative proportions of sodium and potassium chlorides to be selected would depend somewhat on the total alkali chloride concentration desired in the starting brine, the temperature at which the brine is prepared, and the products to be produced. For most practical operations, considering the economics as they are today, the proportions may fall within the range indicated by points A and B at 60° C. This range will shift somewhat depending on the temperature. For example, if brines saturated at temperatures higher than 60° C. can be employed as cell feed, then the relative amount of potassium chloride in the brine at point A, which represents the maximum molar content of the two chlorides at a given saturation temperature, will be increased. Likewise, at higher temperatures for forming the saturated brine, point B, which is optimum for the separation of a maximum amount of pure potassium chloride salt for a given percent decomposition in the cell will fall closer to the peak of the curve. In fact, a temperature at which the point B gives the maximum potassium chloride separation and which also falls at the peak of the solubility curve, would appear to be an ideal temperature for forming the saturated brine. This situation is illustrated above under Example II wherein a temperature of 125° C. and a super atmospheric pressure of 35 lbs. per square inch are employed to obtain directly from the sylvinite ore the desired proportions of potassium chloride and sodium chloride in the brine. The higher the temperature under 125° C. for cell feed the less dilution of this brine is required, with consequent gains in efficiency. Economics of the operating efficiency and the relative values of pure potassium chloride and the final caustic obtained would probably dictate the exact brine composition within the limits of the ratios defined heretofore.

It will be obvious that our process may embrace many details of operation well known in the electrolytic art all of which are to be included if within the following claims.

We claim:

1. A process for obtaining as separate products potassium chloride, chlorine, hydrogen and mixed sodium and potassium hydroxides from mixtures comprising substantial amounts of sodium chloride and potassium chloride, which comprises subjecting a cell feed brine, as anolyte, comprising an aqueous solution of sodium chloride and potassium chloride in proportions providing a mole ion ratio $$\frac{Na^+}{Na^+ + K^+}$$

between 0.24 and 0.90 and the total concentration of both alkali chlorides being in excess of 5.5 moles per liter, to electrolysis carried approximately 40% to 60% of completion to obtain an aqueous catholyte having the same $$\frac{Na^+}{Na^+ + K^+}$$

mole ion ratio, concentrating the catholyte to within the range from about 45% to about 70% water to precipitate substantially pure potassium chloride and recovering a residual caustic alkali solution containing small amounts of unprecipitated K+ and Cl− ions and in which the alkali is primarily sodium hydroxide.

2. A process in accordance with claim 1 in which the $$\frac{Na^+}{Na^+ + K^+}$$

ratio is within the range from about 0.24 to about 0.46.

3. A process in accordance with claim 1 in which the $$\frac{Na^+}{Na^+ + K^+}$$

is within the range from about 0.46 to about 0.90.

4. A process in accordance with claim 1 in which the concentration of the final caustic solution is carried out in a series of stages to recover firstly substantially pure potassium chloride and secondly mixtures of potassium and sodium chlorides.

5. A process in accordance with claim 4 in which the mixed sodium and potassium chlorides are recycled for further recovery of pure potassium chloride.

6. A process for obtaining as separate products potassium chloride, chlorine, hydrogen and mixed sodium and potassium hydroxides from mixtures comprising substantial amounts of sodium chloride and potassium chloride, which comprises subjecting a cell feed brine, as anolyte, comprising an aqueous solution of sodium chloride and potassium chloride having a total concentration of both alkali chlorides in excess of 5.5 moles per liter to electrolysis carried approximately 40 to 60% of completion to obtain an aqueous catholyte having proportions of Na+ and OH− ion providing a mole ion ratio $$\frac{Na^+}{OH^-}$$

between 0.6 and 2.1 concentrating the catholyte to within the range from about 45% to about 70% water to precipitate substantially pure potassium chloride and recovering a residual caustic alkali solution containing small amounts of unprecipitated K+ and Cl− ions and in which the alkali is primarily sodium hydroxide.

7. A process in accordance with claim 6 in which the $$\frac{Na^+}{OH^-}$$

mole ion ratio is within the range from 0.6 to 1.5.

8. A process in accordance with claim 6 in which the $$\frac{Na^+}{OH^-}$$

mole ion ratio is within the range from 1.5 to 2.1.

9. A process in accordance with claim 6 in which the $$\frac{Na^+}{OH^-}$$

mole ion ratio is within the range from 0.46 to 0.95.

10. A process in accordance with claim 6 in which the concentration of the final caustic solution is carried out in a series of stages to recover firstly substantially pure potassium chloride and secondly mixtures of potassium and sodium chlorides.

11. A process in accordance with claim 10 in which the mixed sodium and potassium chlorides are recycled for further recovery of pure potassium chloride.

12. A process for obtaining as separate products potassium chloride, chlorine, hydrogen and mixed sodium and potassium hydroxides from mixtures comprising substantial amounts of sodium chloride and potassium chloride, which comprises subjecting a cell feed brine, as anolyte, comprising an aqueous solution of sodium chloride and potassium chloride in proportions providing a mole ion ratio $$\frac{Na^+}{Na^+ + K^+}$$

between 0.24 and 0.90 and the total concentration of both alkali chlorides being in excess of 5.5 moles per liter, to electrolysis carried approximately 40% to 60% of completion in a diaphragm cell to obtain an aqueous catholyte having the same $$\frac{Na^+}{Na^+ + K^+}$$

mole ion ratio and proportions of Na+ and OH− ion providing a mole ion ratio $$\frac{Na^+}{OH^-}$$

between 0.6 and 2.1, concentrating the catholyte by removal of water in an amount sufficient to precipitate substantially pure potassium chloride while maintaining the $$\frac{Na^+}{OH^-}$$

mole ion ratio in the catholyte substantially constant and recovering a residual caustic alkali solution having substantially the same $$\frac{Na^+}{OH^-}$$

mole ion ratio as the catholyte and containing small amounts of unprecipitated K+ and Cl− ions and in which the alkali is primarily sodium hydroxide.

13. A process in accordance with claim 12 in which the mixture treated comprises sylvinite.

14. A process in accordance with claim 12 in which the mixture treated comprises a mixture of sodium and potassium chlorides prepared from carnallite by adding caustic alkali thereto in an amount to precipitate magnesium as magnesium hydroxide, followed by removal of the magnesium hydroxide.

15. A process in accordance with claim 14 in which the residual caustic alkali solution is recycled for treatment of carnallite.

References Cited in the file of this patent

UNITED STATES PATENTS

| | | |
|---|---|---|
| 1,051,984 | Cameron | Feb. 4, 1913 |
| 1,238,600 | Trumbull | Aug. 28, 1917 |
| 1,259,486 | Cameron | Mar. 19, 1918 |

FOREIGN PATENTS

| | | |
|---|---|---|
| 20,925 of 1899 | Great Britain | Oct. 19, 1900 |